(12) United States Patent
Helot

(10) Patent No.: US 6,297,953 B1
(45) Date of Patent: Oct. 2, 2001

(54) ALIGNMENT MECHANISM FOR COMPUTER SYSTEM HAVING A PORTABLE COMPUTER AND DOCKING STATION

(75) Inventor: Jacques H. Helot, San Mateo, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/071,052

(22) Filed: Apr. 30, 1998

(51) Int. Cl.$^7$ .................................................. G06F 1/16
(52) U.S. Cl. ........................ 361/686; 361/683; D14/107
(58) Field of Search ................................. 361/686, 683, 361/724–727; 364/705.1, 708.1; 312/223.1, 223.2; D14/107

(56) References Cited

U.S. PATENT DOCUMENTS

| | | | |
|---|---|---|---|
| D. 366,034 | * 1/1996 | Youens et al. ................. | D14/107 |
| D. 366,468 | * 1/1996 | Ryan et al. ..................... | D14/107 |
| D. 366,469 | * 1/1996 | Youens ........................... | D14/107 |
| D. 368,704 | * 4/1996 | Tanaka ........................... | D14/107 |
| D. 371,545 | * 7/1996 | Ojeda ............................ | D14/107 |
| D. 372,901 | * 8/1996 | Chu ............................... | D14/107 |
| 5,694,292 | * 12/1997 | Paulsel et al. ................. | 361/686 |
| 5,699,226 | * 12/1997 | Cavello .......................... | 361/686 |
| 5,768,101 | * 6/1998 | Cheng ........................... | 361/687 |
| 5,805,412 | * 9/1998 | Yanagisawa et al. .......... | 361/686 |
| 5,862,036 | * 1/1999 | Lin ................................. | 361/686 |
| 5,933,322 | * 8/1999 | Ruch et al. .................... | 361/686 |
| 6,023,411 | * 8/2000 | Howell et al. ................. | 361/686 |
| 6,028,767 | * 2/2000 | Lan ............................... | 361/686 |
| 6,034,869 | * 3/2000 | Lin ................................. | 361/686 |
| 6,061,233 | * 5/2000 | Jung ............................. | 361/686 |
| 6,061,234 | * 5/2000 | Broder et al. ................. | 361/686 |
| 6,069,790 | * 5/2000 | Howell et al. ................. | 361/686 |
| 6,072,695 | * 6/2000 | Steiger et al. ................ | 361/686 |
| 6,121,958 | * 9/2000 | Clark et al. ................... | 361/680 |
| 6,142,593 | * 11/2000 | Kim et al. ..................... | 361/686 |

* cited by examiner

Primary Examiner—Leo P. Picard
Assistant Examiner—Lisa Lea-Edmonds
(74) Attorney, Agent, or Firm—Curtis G. Rose

(57) ABSTRACT

A computer system has a docking station and a portable computer. The docking station has a platform and a housing having a docking connector. The platform has one or more elevated rails. The portable computer has a computer connector, a base unit having a top portion and a bottom portion, a display unit connected to the top portion of said base unit, and one or more recessed grooves on the bottom portion of the base unit. The elevated rail or rails on the docking station interact with the recessed groove or grooves on the portable computer to guide the portable computer into a proper alignment with the housing of the docking station when the portable computer is placed on the platform and slid towards the housing so that the computer connector lines up with and connects to the docking connector. The docking station platform may have side walls or rotatable bumpers on the sides of the platform to provide coarse alignment between the docking station and the portable computer, and to prevent the portable computer from sliding off the platform during the alignment process. Preferably, the recessed groove or grooves are flared at the back edge of the portable computer to further assist in the alignment of the portable computer with the docking station. The docking station of the preferred and alternate embodiments of the invention can accommodate portable computers of different form factors and thus do not need to be replaced each time a new model of a personal computer is released with a different form factor.

6 Claims, 8 Drawing Sheets

ALIGNMENT MECHANISM FOR COMPUTER SYSTEM HAVING A PORTABLE COMPUTER AND DOCKING STATION

FIELD OF THE INVENTION

This invention relates to the electronics circuitry field. More particularly, this invention is an alignment mechanism for a computer system having a portable computer and a docking station.

BACKGROUND OF THE INVENTION

Portable computers have grown in popularity over the last several years. Despite the fact portable computers are by their nature small, lightweight, and easy to carry from place to place, their capabilities, memory and processing power rivals that of their much larger sibling, the desktop computer. In fact, portable computers are so handy, especially for today's mobile computing professionals, that it is difficult to see why anyone needs a large, bulky desktop computer anymore.

One major drawback of portable computers is their relative inflexibility to easily attach peripherals, such as printers, modems, external speakers, external monitors, external input devices, and the like. If a portable computer is going to truly replace a desktop computer when the user is in his or her office, the quick, easy, flexible attachment of peripherals is important.

More recently, docking stations have been developed for portable computers that allows them to more flexibly attach peripherals. Docking stations vary in complexity from relatively simple manually operated port replicators to more complex mechanically operated full-fledged docking systems. When a portable computer is connected to these docking stations, such as when a user is in his or her office, substantially all of the benefits of a desktop system can be achieved, while maintaining the flexibility the user has to take the portable computer with him or her on the road.

While docking stations have made it possible for portable computers to be true desktop replacements, they are not without their problems. One such problems is the relatively difficult nature of connecting a portable computer to the docking station in the first place. If the docking station does not have a complex mechanical mechanism to assist the user with this docking process, many users will be unable to successfully accomplish the docking process in a repeated manner, and may even damage the docking station, the portable computer, or both. Unfortunately, the existence of a complex mechanical mechanism greatly adds to the cost, size, and weight of the docking station. As the docking station gets bigger, heavier, and more expensive, the benefits of the portable computer and docking station over a desktop computer become less apparent.

Another problem with docking stations is that they typically must change every time a new model of a portable computer is released that has a different size than previous models of the portable computer. This raises the expense of the computing system, and again makes the benefits of a portable computer and docking station versus a desktop computer less apparent.

SUMMARY OF THE INVENTION

A computer system has a docking station and a portable computer. The docking station has a platform and a housing having a docking connector. The platform has one or more elevated rails. The portable computer has a computer connector, a base unit having a top portion and a bottom portion, a display unit connected to the top portion of said base unit, and one or more recessed grooves on the bottom portion of the base unit. The elevated rail or rails on the docking station interact with the recessed groove or grooves on the portable computer to guide the portable computer into a proper alignment with the housing of the docking station when the portable computer is placed on the platform and slid towards the housing so that the computer connector lines up with and connects to the docking connector. The docking station platform may have side walls or rotatable bumpers on the sides of the platform to provide coarse alignment between the docking station and the portable computer, and to prevent the portable computer from sliding off the platform during the alignment process. Preferably, the recessed groove or grooves are flared at the back edge of the portable computer to further assist in the alignment of the portable computer with the docking station. The docking station of the preferred and alternate embodiments of the invention can accommodate portable computers of different form factors and thus do not need to be replaced each time a new model of a personal computer is released with a different form factor.

DETAILED DESCRIPTION OF THE PREFERRED EMBODIMENT

Figure 1:
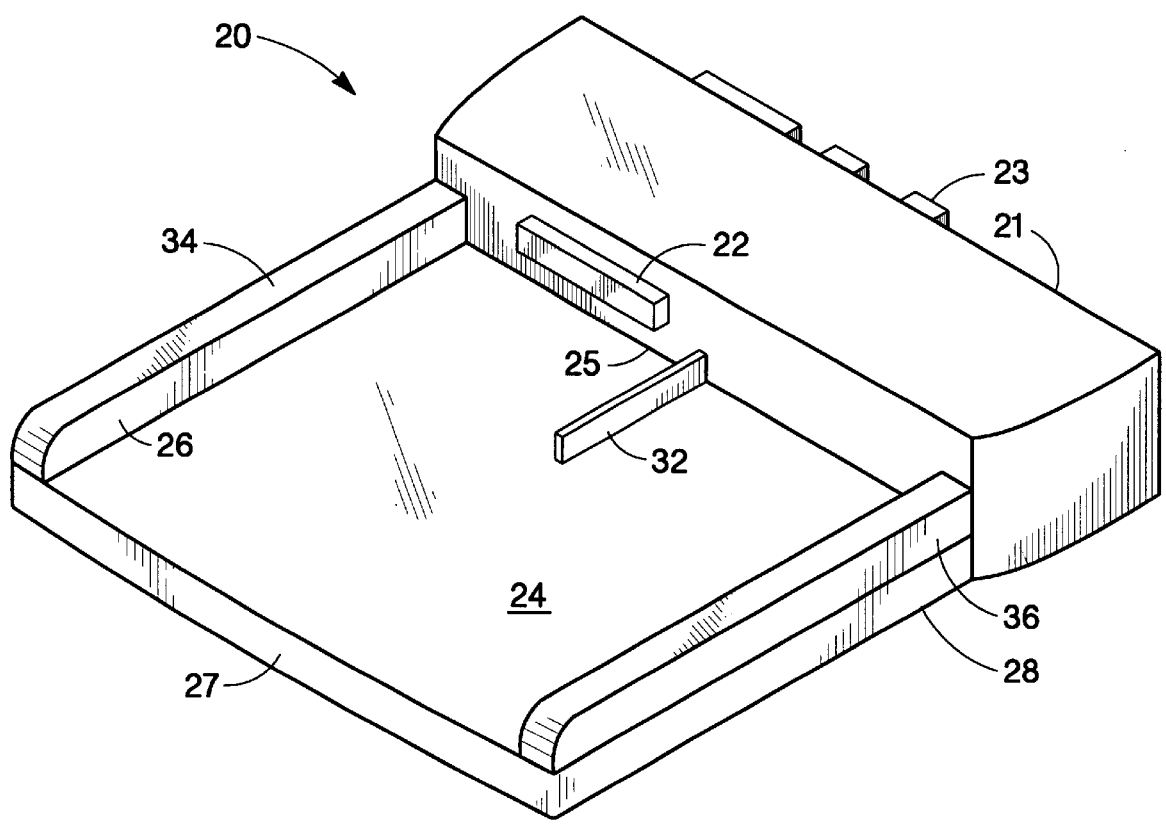
FIG. 1 shows the docking station of the computing system of the preferred embodiment of the invention.

FIG. 1 shows the docking station of the computing system of the preferred embodiment of the invention. Docking station 20 has housing 21 and platform 24. Housing 21 has docking connector 22 and peripheral connectors 23. Platform 24 has back side 25, left side 26, front side 27, and right side 28. In the preferred embodiment, platform 24 has elevated rail 32. Note that elevated rail 32 is substantially centered on housing 21 between left side 26 and right side 28 of platform 24. Those skilled in the art will appreciate that elevated rail 32 and docking connector 22 could be positioned differently on platform 24 and still fall within the spirit and scope of the invention. For example, docking connector 22 could be located between elevated rail and right side 28 on platform 24. In the preferred embodiment, platform 24 also contains left wall 34 and right wall 36. Left wall 34 and right wall 36 provide coarse alignment of the portable computer in a manner that will be described in more detail later, and are of a sufficient height to prevent a portable computer, when placed on platform 24, from sliding off left side 26 or right side 28 of platform 24.

Figure 2:
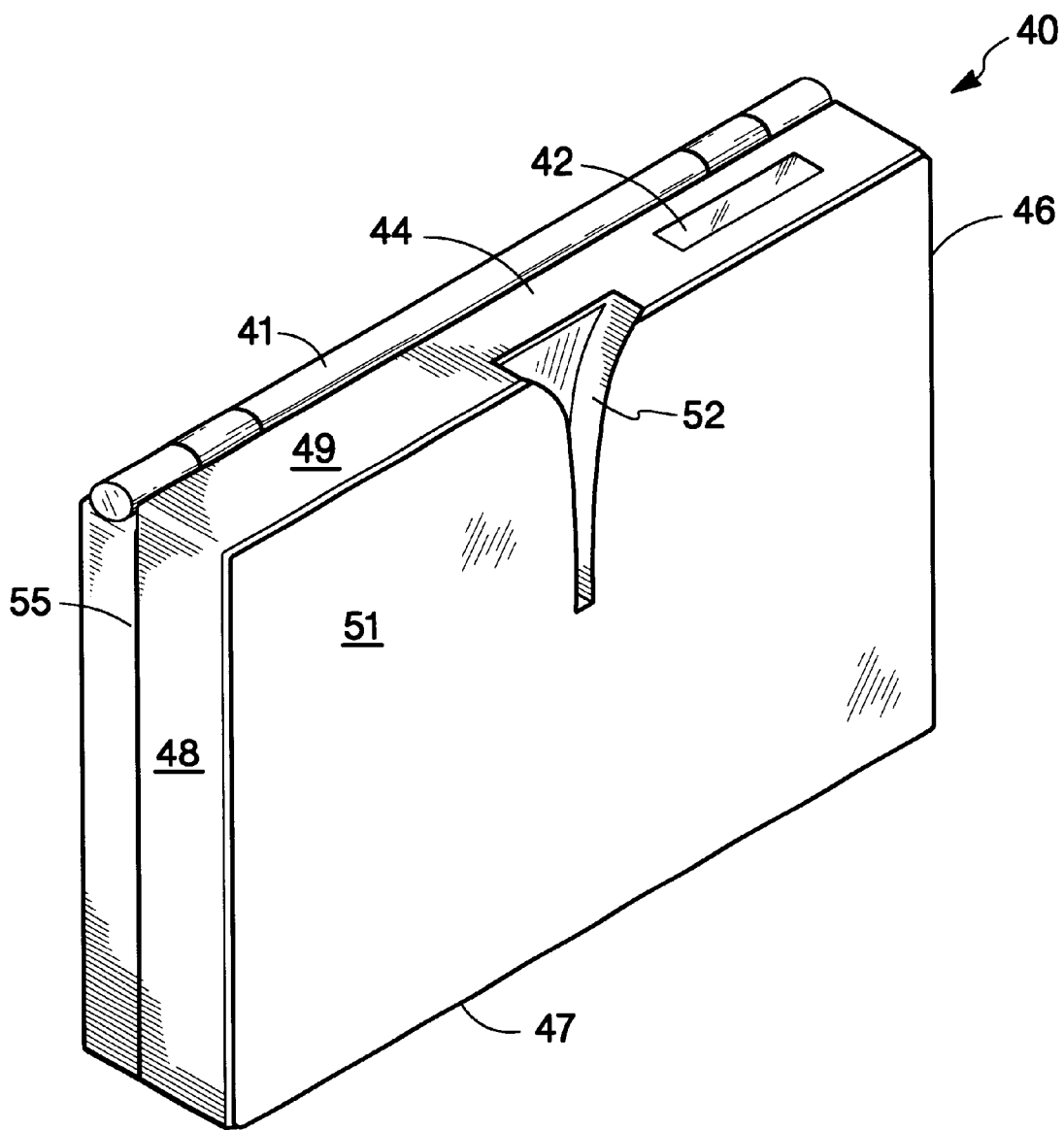
FIG. 2 shows the portable computer of the computing system of the preferred embodiment of the invention.

FIG. 2 shows the portable computer of the computing system of the preferred embodiment of the invention. For ease of understanding, an isometric bottom view of portable computer 40 is shown in FIG. 2. Portable computer 40 has display unit 41 and base unit 44. Base unit 44 has left edge 46, front edge 47, right edge 48, and back edge 49. Computer connector 42 is located on back edge 49. Base unit 44 also has bottom portion 51 and top portion 55. Bottom portion 51 has recessed groove 52. In the preferred embodiment, recessed groove 52 is flared at back edge 49 to allow for easier alignment of portable computer 40 with docking station 20, as will be discussed in more detail later.

Figure 3:
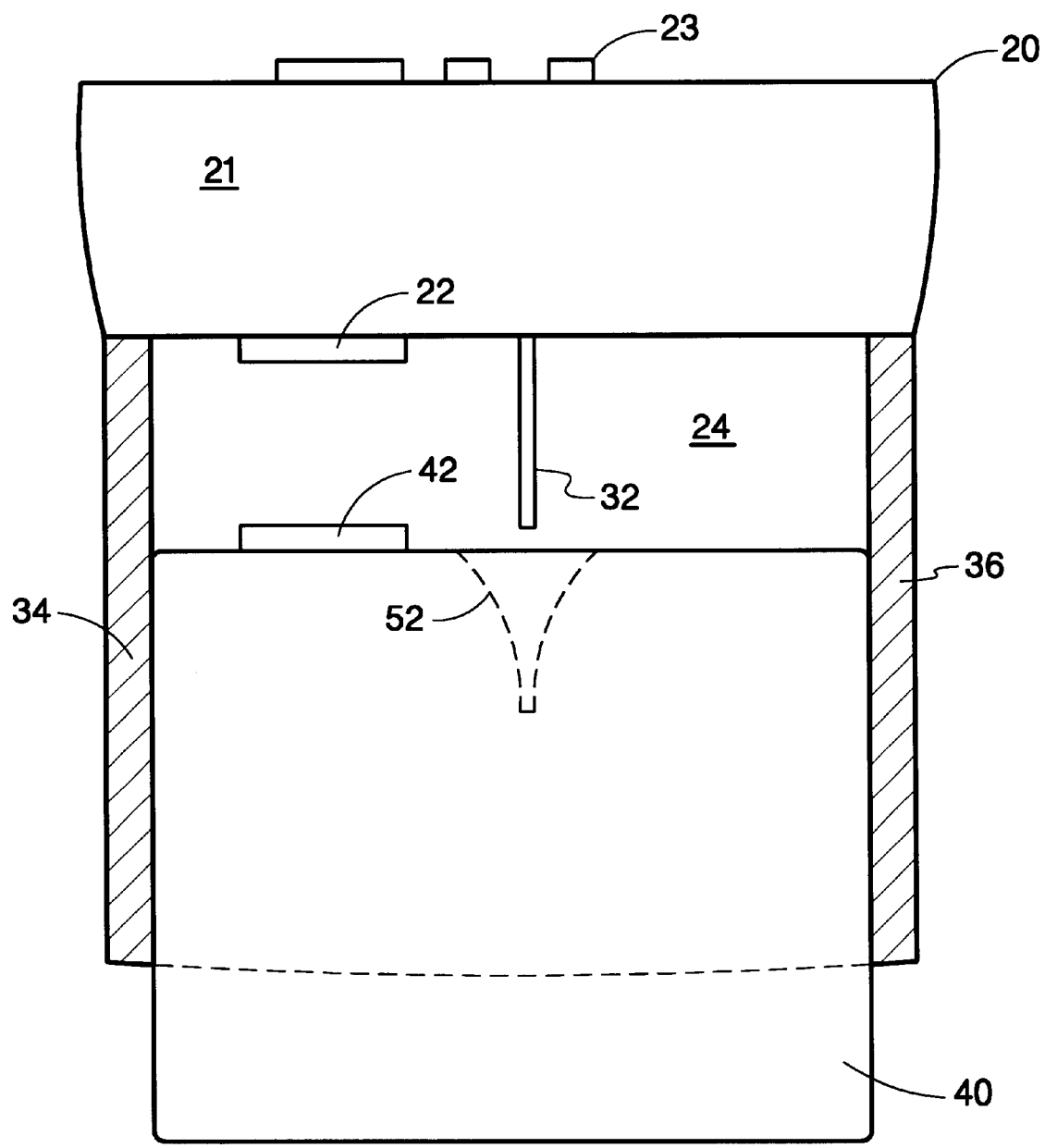
FIG. 3 shows the docking station of the computing system of the preferred embodiment of the invention aligning with the portable computer of the preferred embodiment of the invention.

FIG. 3 shows the docking station of the computing system of the preferred embodiment aligning with the portable computer of the preferred embodiment of the invention. Portable computer 40 is placed on platform 24 of docking station 20. As portable computer 40 is slid on platform 24 towards housing 21, left side wall 34 and right side wall 36 keep portable computer 40 in coarse alignment with docking station 20, and also prevents portable computer 40 from sliding off the left side or right side of platform 24. Elevated rail 32 interacts with recessed groove 52 (shown in dashed lines since it is not visible from the top of portable computer 40) to provide fine alignment between portable computer 40 and docking station 20, such that computer connector 42 mates with docking connector 22.

Figure 4:
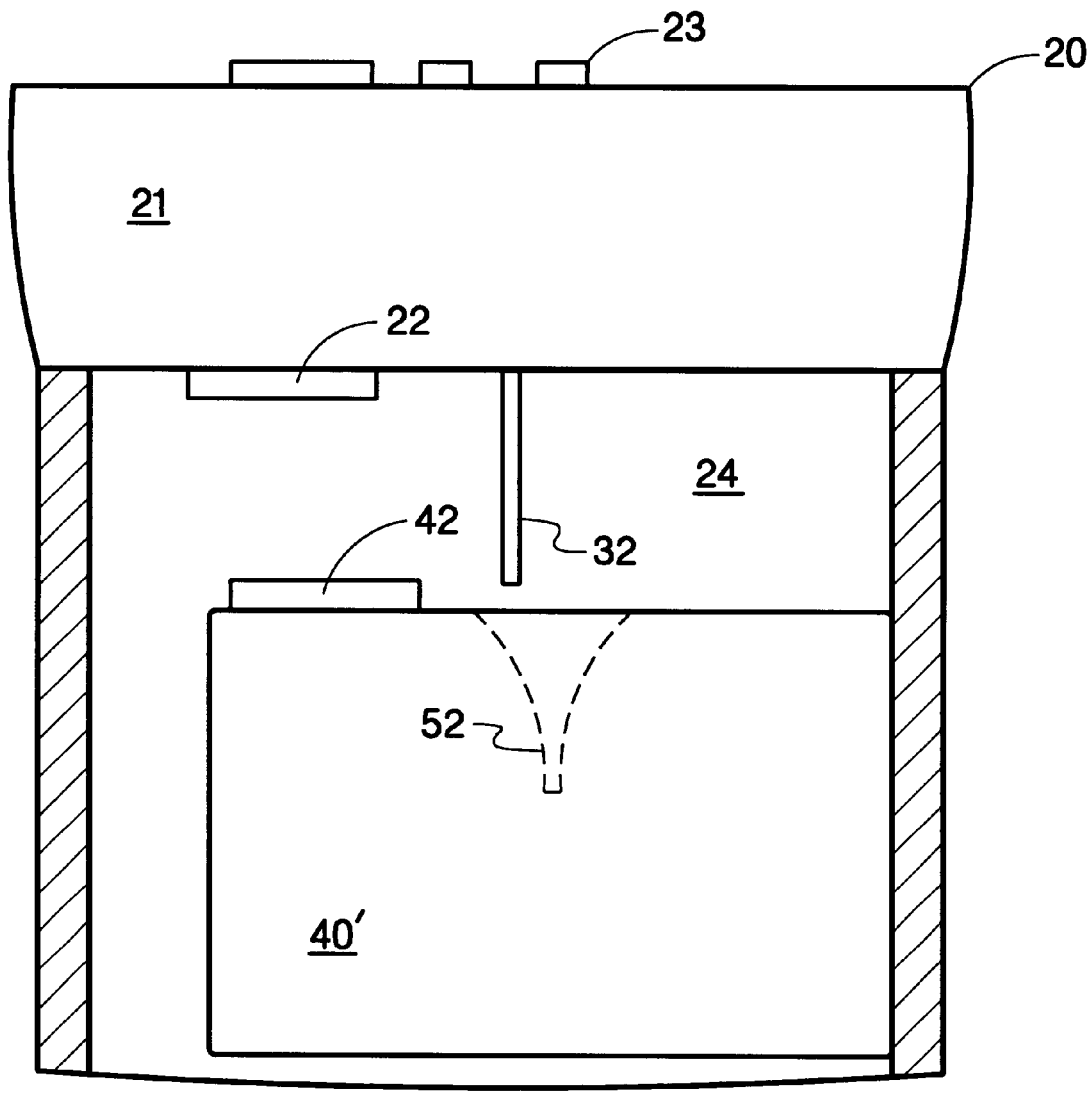
FIG. 4 shows the docking station of the computing system of the preferred embodiment aligning with the portable computer of an alternate embodiment of the invention.

FIG. 4 shows the docking station of the computing system of the preferred embodiment of the invention aligning with the portable computer of an alternate embodiment of the invention. As in FIG. 3, portable computer 40' is placed on platform 24 of docking station 20 . As FIG. 4 shows, portable computer 40' has a different form factor than portable computer 40. Specifically, portable computer 40' is considerably smaller than portable computer 40. Nevertheless, as portable computer 40' is slid on platform 24 towards housing 21, left side wall 34 and right side wall 36 keep portable computer 40' in coarse alignment with docking station 20, and also prevents portable computer 40' from sliding off the left side or right side of platform 24. As before, elevated rail 32 interacts with recessed groove 52 of portable computer 40' to provide fine alignment between portable computer 40' and docking station 20 such that computer connector 42 mates with docking connector 22. Note that the flared portion of recessed groove 52 brings portable computer 40' into fine alignment with docking station 20 regardless of the initial position portable computer 40' is placed on platform 24.

Figure 5:
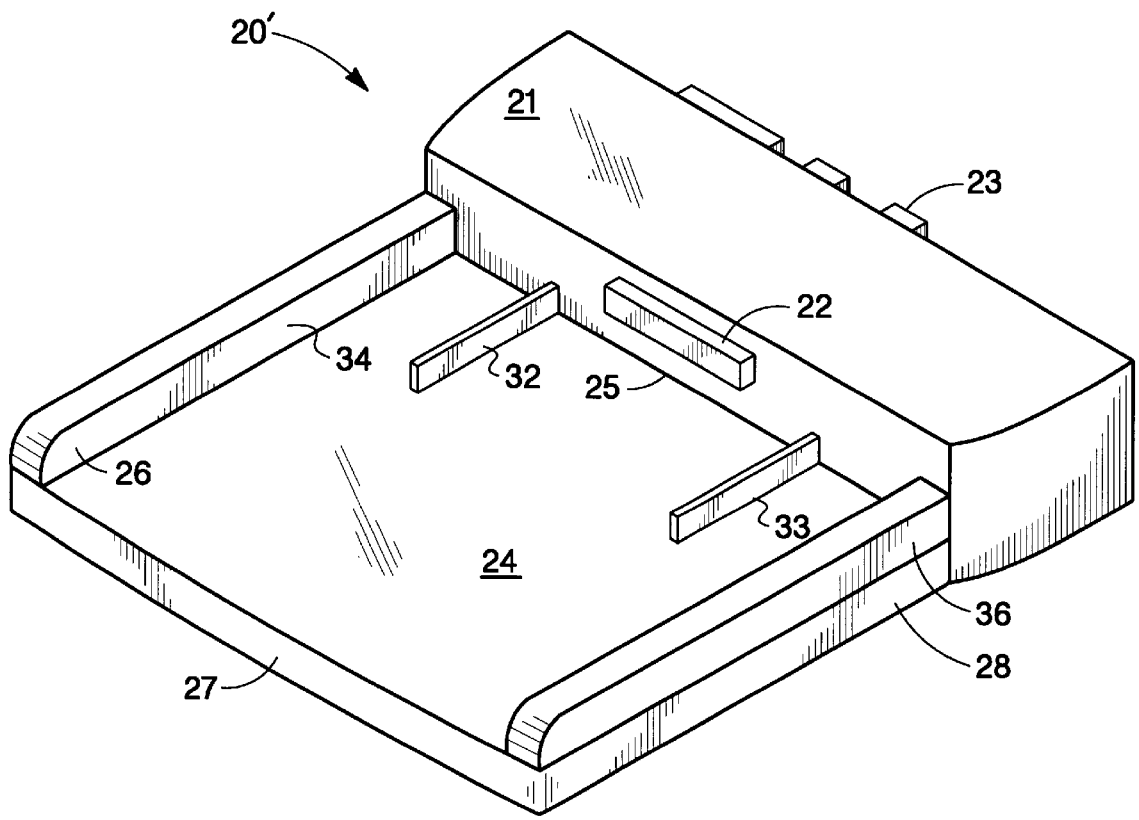
FIG. 5 shows a docking station of an alternate embodiment of the invention.

FIG. 5 shows a docking station of an alternate embodiment of the invention. Docking station 20' is very similar to docking station 20 of FIG. 1, except that docking connector 22 is substantially centered on housing 21 between left side 26 and right side 28 of platform 24. In addition, platform 24 contains second elevated rail 33. Elevated rail 32 is located between docking connector 22 and left side rail 26. Second elevated rail 33 is located between docking connector 22 and right side 28 of platform 24. Second elevated rail 33 allows for even finer alignment between a docking station and a portable computer. In addition, when docking connector 22 is substantially centered between left wall 26 and right wall 28, a wider variety of portable computers having different form factors can be accommodated by docking station 20'.

Figure 6:
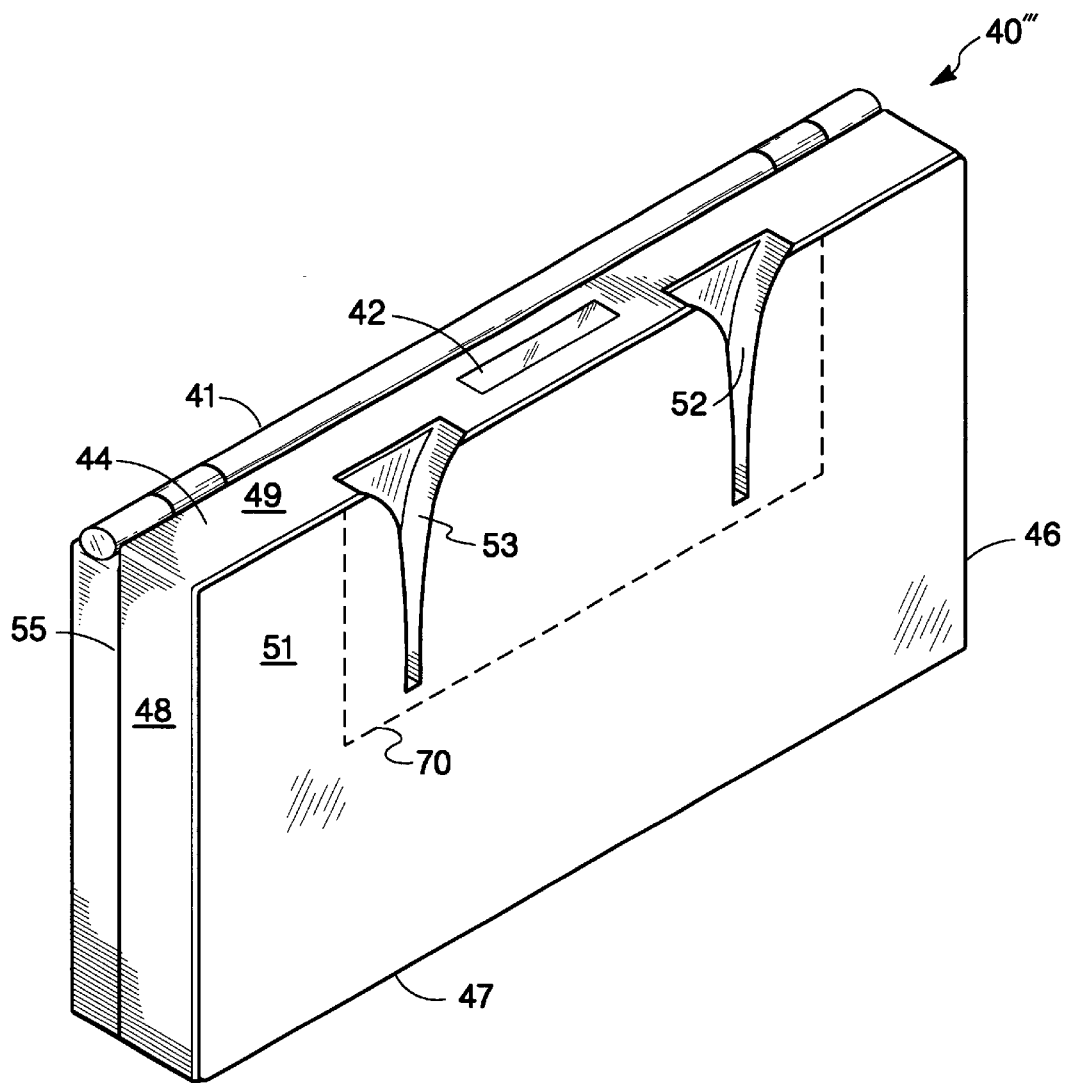
FIG. 6 shows a portable computer of an alternate embodiment of the invention.

FIG. 6 shows a portable computer of an alternate embodiment of the invention. Portable computer 40" is very similar to portable computer 40 of FIG. 2, except that computer connector 42 is substantially centered on back edge 49 between left edge 46 and right edge 48. In addition, bottom portion 51 contains second recessed groove 53. Recessed groove 52 is located between computer connector 42 and left edge 46. Second recessed groove 53 is located between computer connector 42 and right edge 48. Recessed groove 52 and second recessed groove 53 of portable computer 40" interact with elevated rail 32 and second elevated rail 33, respectively, of docking station 20' when portable computer 40" is placed on platform 24 and slid towards housing 21 of docking station 20'. Those skilled in the art will appreciate that portable computer 40" could have a form factor considerably smaller than that shown in FIG. 6 yet still aligning properly and be usable with docking station 20'. For example, portable computer 40" could be no wider than the width and length encompassing recessed grooves 52 and 53, as shown by dashed line 70. If recessed grooves 52 and 43 were closer together, the form factor could be even smaller, and could be the size of a palmtop portable computer, a personal information manager, a pager or a cellular phone. For the purposes of this invention, any or all of these devices, if used with a docking station such as that discussed herein, are considered to be "portable computers" as this term is used herein.

Figure 7:
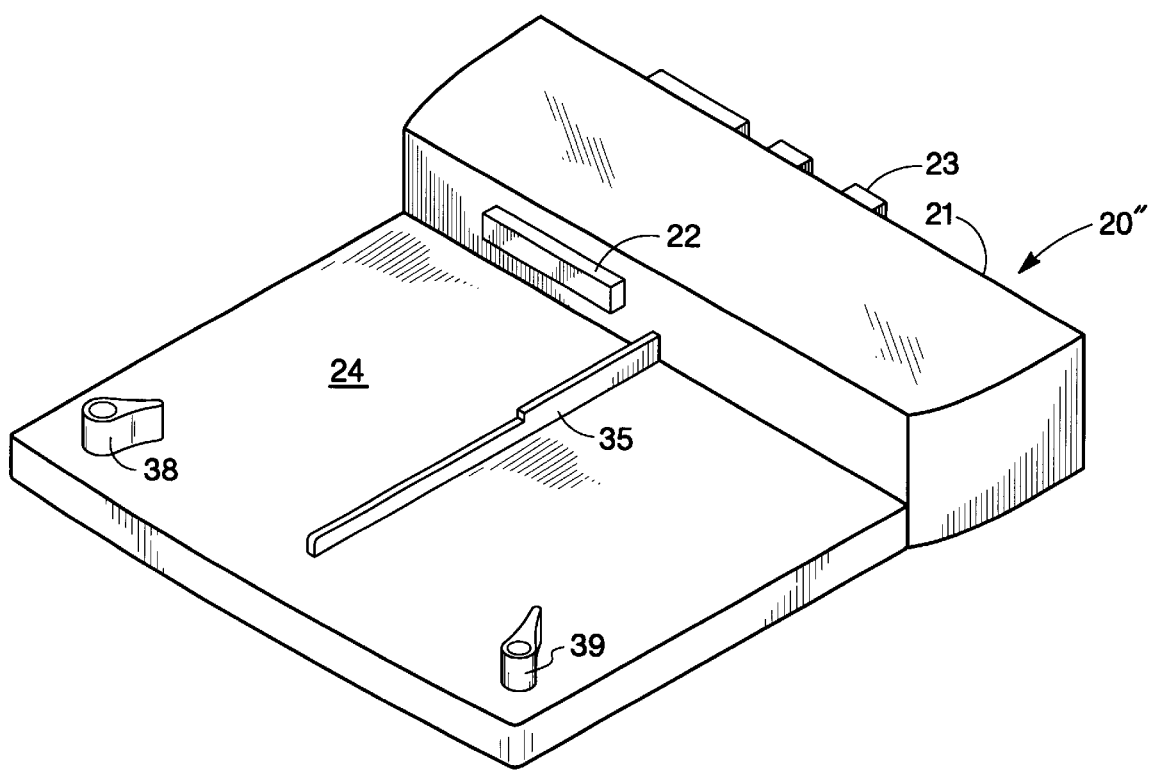
FIG. 7 shows a docking station of another alternate embodiment of the invention.

FIG. 7 shows a docking station of another alternate embodiment of the invention. Docking station 20" is similar to docking station 20 of FIG. 1, except that side walls 34 and 36 have been replaced by rotatable bumpers 38 and 39. In addition, elevated rail 35 of docking station 20" is more elongated than elevated rail 32 of docking station 20. This allows elevated rail 35 to interact with recessed groove 52 of portable computer 40 (FIG. 2) when portable computer 40 is first placed on platform 24 of docking station 20". Left rotatable bumper 38 and right rotatable bumper 39 provide coarse alignment of portable computer 40 with docking station 20", in a manner similar to the function provided by side walls 34 and 36 of docking station 20 (FIG. 1). Rotatable bumpers 38 and 39 are of sufficient height to prevent portable computer 40 from sliding off the left side or right side of platform 24. A portable computer having a small form factor can be placed on platform 24 between rotatable bumpers 38 in 39 without causing rotatable bumpers 38 in 39 to be deflected towards housing 21 as this smaller portable computer is slid on platform 24 towards housing 21. Likewise, a portable computer having a larger form factor can be placed on platform 24 between rotatable bumpers 38 and 39, but the larger size of this portable computer causes rotatable bumpers 38 in 39 to rotatably deflect towards housing 21 as this larger portable computer is slid on platform 24 towards housing 21. In this matter, bumpers 38 and 39 provide coarse alignment for a wide variety of portable computers having different form factors.

Figure 8:
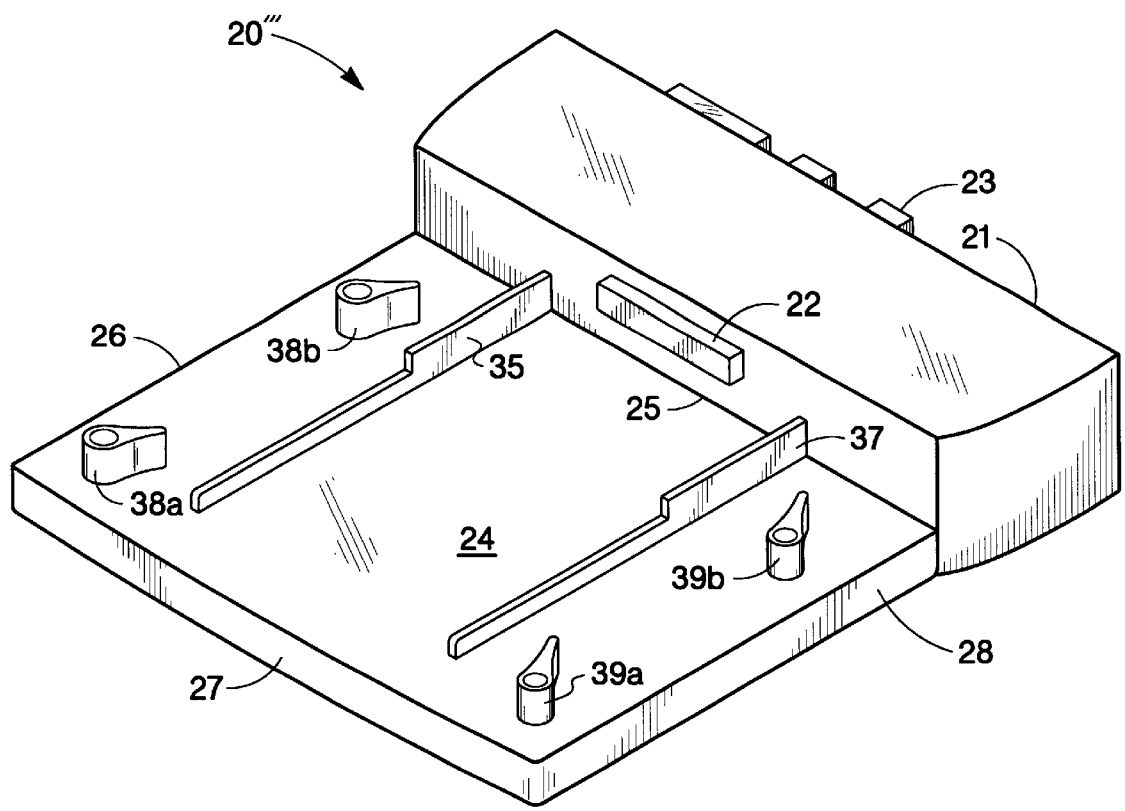
FIG. 8 shows a docking station of still another alternate embodiment of the invention.

FIG. 8 shows a docking station of still another alternate embodiment of the invention. Docking station 20''' is similar to docking station 20" in FIG. 7, except that docking connector 22 is substantially centered on housing 21 between the left side and right side of docking station 20'''. In addition, elevated rail 35 is positioned between docking connector 22 and left side 26, and second elevated rail 37 is positioned between docking connector 22 and right side 28. Also, left rotatable bumper 38 of FIG. 7 is shown in FIG. 8 as a pair of left rotatable bumpers 38*a* and 38*b*, and right rotatable bumper 39 of FIG. 7 is shown as a pair of right rotatable bumpers 39*a* and 39*b*. The additional elevated rail and bumpers provide for even finer alignment between portable computer 40" (FIG. 6) and docking station 20''', in applications where the additional expense for this finer alignment is warranted.

What is claimed is:

1. A docking station for a portable computer having a computer connector, said docking station comprising:
   a housing having a docking connector;
   a platform having a front side, a back side, a left side, and a right side, said platform joined at said back side to said housing;
   said platform having an elevated rail for guiding said portable computer into a proper alignment with said housing of said docking station when said portable computer is placed on said platform and slid towards said housing so that said computer connector lines up with and connects to said docking connector;
   a left rotatable bumper at the left side of the platform;
   a right rotatable bumper at the right side of the platform; and
   said left rotatable bumper and said right rotatable bumper being of sufficient height to prevent said portable computer from sliding off the left side or right side of the platform.

2. A docking station for a portable computer having a computer connector, said docking station comprising:
   a housing having a docking connector;
   a platform having a front side, a back side, a left side, and a right side, said platform joined at said back side to said housing;
   said platform having an elevated rail for guiding said portable computer into a proper alignment with said housing of said docking station when said portable computer is placed on said platform and slid towards said housing so that said computer connector lines up with and connects to said docking connector;
   a second elevated rail for guiding said portable computer into said proper alignment with said housing of said docking station when said portable computer is placed on said platform and slid towards said housing so that said computer connector lines up with and connects to said docking connector;
   wherein said docking connector is substantially centered between said left side and said right side of said platform
   wherein said elevated rail is between said docking connector and said left side of said platform, and wherein said second elevated rail is between said docking connector and said right side of said platform;
   a left rotatable bumper at the left side of the platform;
   a right rotatable bumper at the right side of the platform; and
   said left rotatable bumper and said right rotatable bumper being of sufficient height to prevent said portable computer from sliding off the left side or right side of the platform.

3. A method of aligning a docking station having an elevated rail on a platform and a docking connector in a housing with a portable computer having a recessed groove on a bottom portion of a base unit and a computer connector on a back portion of said base unit, wherein said recessed groove is flared, said method comprising the steps of:
   placing said portable computer on said platform of said docking station; and
   sliding said portable computer towards said housing so that said flared recessed groove on said portable computer interacts with said elevated rail, and said computer connector lines up with and connects to said docking connector.

4. A computer system comprising a docking station and a portable computer, said portable computer having a front edge, a back edge, a left edge, a right edge, and a computer connector on said back edge, said docking station further comprising:
   a housing having a docking connector;
   a platform having a front side, a back side, a left side, and a right side, said platform joined at said back side to said housing;
   said platform further comprising an elevated rail;
   said portable computer further comprising:
     a base unit having a top portion and a bottom portion;
     a display unit connected to the top portion of said base unit;
     said bottom portion of said base unit of said portable computer further comprising a recessed groove; and
     said elevated rail on said docking station interacting with said recessed groove on said portable computer to guide said portable computer into a proper alignment with said housing of said docking station when said portable computer is placed on said platform and slid towards said housing so that said computer connector lines up with and connects to said docking connector;
   wherein the recessed groove is flared at the back edge of the portable computer.

5. A computer system comprising a docking station and a portable computer, said portable computer having a front edge, a back edge, a left edge, a right edge, and a computer connector on said back edge, said docking station further comprising:
   a housing having a docking connector;
   a platform having a front side, a back side, a left side, and a right side, said platform joined at said back side to said housing;
   said platform further comprising an elevated rail;
   said portable computer further comprising:
     a base unit having a top portion and a bottom portion;
     a display unit connected to the top portion of said base unit;
     said bottom portion of said base unit of said portable computer further comprising a recessed groove; and
     said elevated rail on said docking station interacting with said recessed groove on said portable computer to guide said portable computer into a proper alignment with said housing of said docking station when said portable computer is placed on said platform and slid towards said housing so that said computer connector lines up with and connects to said docking connector;
   wherein the elevated rail abuts the housing.

6. The computer system of claim 4, wherein the elevated rail abuts the housing.

* * * * *